United States Patent [19]

Vlock

[11] Patent Number: 5,508,574
[45] Date of Patent: Apr. 16, 1996

[54] VEHICLE TRANSMISSION SYSTEM WITH VARIABLE SPEED DRIVE

[76] Inventor: Alexander Vlock, 185 W. End Ave., New York, N.Y. 10023

[21] Appl. No.: 344,163

[22] Filed: Nov. 23, 1994

[51] Int. Cl.$^6$ ................................................ H02K 47/04
[52] U.S. Cl. ........................... 310/113; 310/83; 475/149; 475/150
[58] Field of Search .................... 475/1, 5, 149, 475/150, 151, 153; 477/3; 310/83, 68 B, 75 R, 58, 54, 60 A, 113

[56] References Cited

U.S. PATENT DOCUMENTS

| | | | |
|---|---|---|---|
| 2,908,189 | 10/1959 | Parker et al. | 475/1 X |
| 4,423,794 | 1/1984 | Beck | 475/149 X |
| 4,729,258 | 3/1988 | Mohri et al. | 475/5 |
| 5,034,638 | 7/1991 | McCabria | 310/58 X |
| 5,052,988 | 10/1991 | Ishikawa et al. | 475/153 X |
| 5,168,946 | 12/1992 | Dorgan | 475/5 X |
| 5,334,116 | 8/1994 | Baxter, Jr. | 475/149 X |
| 5,396,968 | 3/1995 | Hasebe et al. | 475/150 X |
| 5,448,118 | 9/1995 | Nakamura et al. | 310/58 X |

Primary Examiner—Charles A. Marmor
Assistant Examiner—Peter Kwon

[57] ABSTRACT

A vehicle transmission system is described which employs a split power path design to achieve continuously variable speed ratios. A motor-generator unit is provided for converting a fraction of the input power into electrical power, and a second motor-generator and differential gear mechanism are employed to re-combine the two power components before transmitting the mechanical power through a gearbox. Electrical power dissipation means allows the transmission system to provide slippage when accelerating a load from rest, and it also assists in shifting and in braking. An electronic motor controller coordinates feedback signals from various sensors and controls the dynamic performance of the entire system. The motor-generators are integrated with the housing of the transmission and have water jackets to assist in heat dissipation. The motor-generator pair and the power dissipation elements are all cooled by a circulating fluid which transfers heat from these components to an external heat exchanger.

15 Claims, 7 Drawing Sheets

VEHICLE TRANSMISSION SYSTEM WITH VARIABLE SPEED DRIVE

FIELD AND BACKGROUND OF THE INVENTION

The present invention relates to mechanical power transmissions which provide continuously variable torque and speed ratios. More specifically, it relates to transmissions that employ motors and generators coupled with planetary gearing to generate variable speeds.

Conventional transmissions used on large diesel trucks typically require a large number of gears for optimum engine performance. This is because diesel engines, unlike gasoline engines, generally operate most effectively within a narrow speed range. As a result, large trucks can increment their speeds by only a small amount in any given gear, making it necessary to employ large numbers of gears to cover the full speed range of the vehicle. It is not uncommon, for example, to find trucks that have 9, 13, or 18 gear ratios.

An ideal transmission would have an infinite number of "gear" ratios to allow the speed of the output shaft to vary while the input remains constant. Such a device is referred to as a continuously variable transmission, or CVT. Some CVT's use belts wrapped around variable diameter pulleys for providing variable speed and torque ratios, while others use fluids or other power transmission elements. Most CVT's, however, are not rugged enough for handling large quantities of torque and power, and many will show signs of wear after prolonged usage. By contrast, this invention provides a continuously variable transmission that is relatively simple in construction and extremely rugged for heavy-duty usage. Furthermore, only a few gear ratios are necessary for attaining maximum speed, in fact far fewer gears than would be required in a comparable standard transmission.

On trucks and buses it is often necessary to brake the vehicle over long downgrades or repeated stops and starts without placing excessive wear on the service brakes. On automatic transmissions, speed retardation is achieved by means of the fluid coupling which converts the kinetic energy into heat. With standard transmissions, an engine compression brake is often used that converts the engine into a power-consuming air compressor. When this brake is used with a conventional transmission, the driver is required to change gears as the vehicle decelerates to maintain an optimum engine speed. The present invention, when used in conjunction with such a compression brake, removes this burden from the driver, since the driver is not required to shift gears to keep the engine brake operating at the proper speed; the transmission can automatically maintain a constant engine speed even as the vehicle accelerates or decelerates during braking, and it can also shift automatically when required.

It is well known that any type of CVT unit can be combined with a differential gear mechanism to reduce the full power load that would otherwise have to be handled entirely by the CVT. It is further known that a motor and generator can operate collectively as a CVT unit. Examples of this concept abound in the patent literature and can be found in the references cited. One of the earliest inventions which discloses the idea for combining motors and generators as CVT's in conjunction with planetary gearing can be found in U.S. Pat. No. 1,515,321 issued in 1924. Numerous elaborations on this idea have appeared in the patent literature since that time, and new embodiments of the same concept continue to be patented on a regular basis. Despite all these patents, however, there are still no transmissions in commercial production employing the split-power principle embodied in these inventions. Most of these inventions lack the specificity that is required to build an actual working transmission. Furthermore, these inventions may work well in theory using ideal elements but may not work efficiently using real components operating at high speeds and with stressful loads.

Accordingly, the general object of the invention is to provide a novel design, arrangement and integration of parts for a significantly improved transmission system. Part of the general object is also to provide a complete disclosure of the invention through detailed drawings, descriptions, and extensive mathematical analysis.

Another object of the invention is to provide a transmission which does not require a mechanical clutch and which is extremely simple to operate.

A further object of the invention is to provide a transmission which has an integral speed retarder and which can operate with an external (engine) retarder if necessary.

The present invention, which is the culmination of thousands of hours of research and development, is highly specific in its claims. The claims are limited to certain factors which include, among other things, the design parameters of the motor-generator units. For example, the invention requires that the outer diameters of the motor-generators be larger than their widths, which is uncommon for a typical D.C. motor. The invention also qualifies these motor-generators by requiring that they be of the permanent magnet type. Even further, the claims require that the rotors carry the permanent magnets and that the stators carry the windings, which is the reverse of the conventional D.C. motor. Of course, all these restrictions make it possible for any manufacturer to circumvent the patent merely by changing just one of these design parameters. However, these design specifications are essential to the technological and commercial viability of the present invention.

SUMMARY OF THE INVENTION

The present invention provides a transmission that offers continuously variable speed ratios. The transmission can produce large speed increments in output using only a small number of gears and with little or no acceleration of the engine. The invention also provides an optional braking feature that can operate independently or in conjunction with an external retarder to allow optimal braking performance and simplicity of operation.

The transmission employs a unique design and arrangement of motor-generator units along with a differential gear mechanism to provide a split power path transmission. The motor-generator units are specially designed to be integrated with the housing of the transmission and to be cooled by a surrounding water jacket. A motor controller and power dissipation elements are integrated with the motor-generator units to control the dynamic performance of the system. The motor-generator units combined with the planetary gearset constitute an electromechanical torque converter. The torque converter front end is coupled to a rear gearbox which increases the overall torque/velocity range of the vehicle.

The system can operate either in driving mode or in braking mode. During normal driving, the motor-generator unit coupled to the input (engine) shaft operates as a generator while the other unit functions as a motor. Although the input shaft has a partial mechanical connection with the output shaft, the engine and output shafts do not accelerate proportionally; the engine speed can accelerate at a much slower rate than the vehicle, thus providing a substantially improved velocity range per gear ratio. The motor, which supplies some of the power, produces most of the vehicle acceleration.

As the motor drives one input shaft of the differential, it not only transmits a torque to the output, it also generates a reaction torque on the engine which tends to restrain it. A further load on the engine is imposed by the generator which supplies power required by the motor. If the motor produces too little torque, the engine will accelerate freely. If it provides too much torque, the engine will decelerate. By driving the motor with just the right amount of torque for a given throttle setting, the engine can be held at a given speed. The motor controller is responsible for programming the motor to produce the exact amount of torque needed to maintain the proper engine speed. To assist in this task, feedback is supplied to the controller by velocity or position sensors coupled to the motor-generator shafts. Current sensors are also provided to measure the current in the motor and generator windings, since torque is directly proportional to current in a DC motor.

Figure 6:
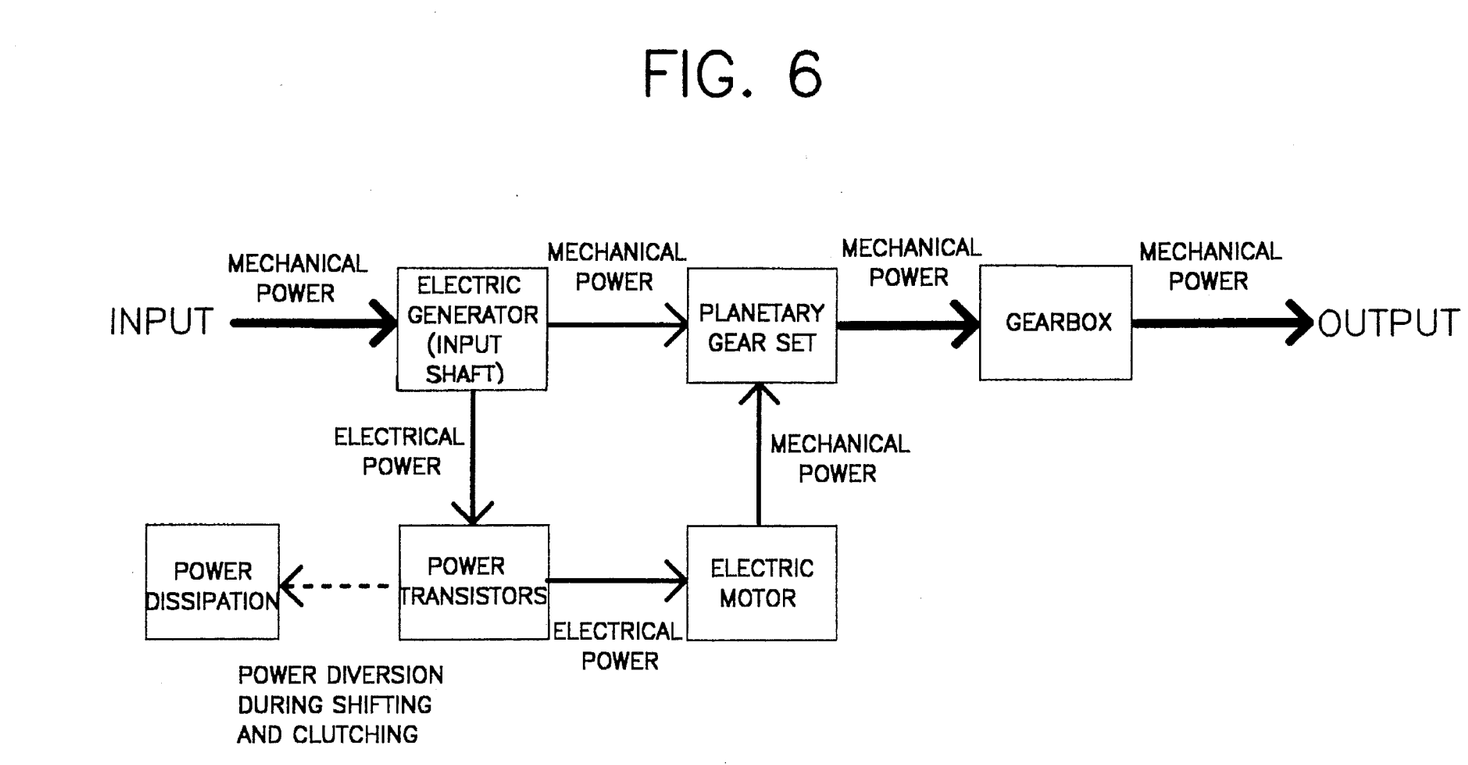
FIG. 6 is a schematic diagram illustrating the flow of power in driving mode.
Figure 7:
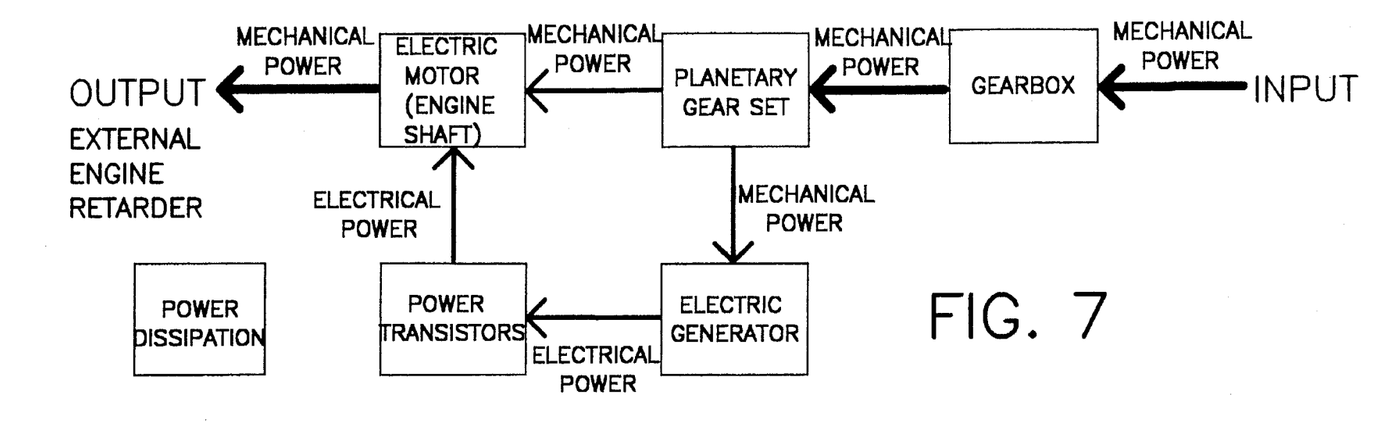
FIG. 7 is a schematic diagram illustrating the flow of power in external braking mode.
Figure 8:
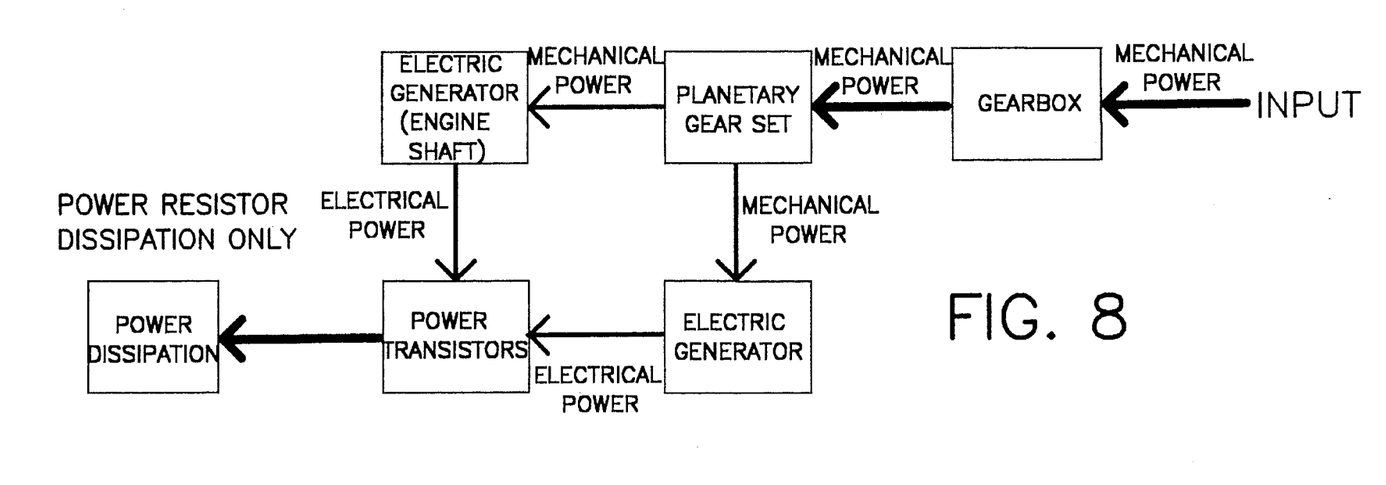
FIG. 8 is a schematic diagram illustrating the flow of power in resistive braking mode.

If braking is performed with an external engine retarder, the motor and generators reverse roles. The generator on the engine shaft then functions as a motor and drives the engine retarder. The motor operates as a generator and absorbs energy from the vehicle to drive the engine retarder. As in driving mode, some vehicle power flows between the vehicle and the engine by direct mechanical connection, and the rest of the power is routed through the motor-generator units. The only difference is that the entire power flow is reversed. This is illustrated diagrammatically in the flow charts.

If no external speed retarder is employed, then braking can be achieved by operating both motor-generator units as generators and dissipating the braking power through the resistor. This braking method cannot be used on long downgrades, however, because the engine radiator is generally not designed to dissipate excessive amounts of heat.

The transmission can be operated either as a standard, semi-automatic, or full-automatic transmission. A standard transmission would require an external clutch while a semi- or full-automatic does not. (It would be superfluous to include a clutch in this invention since the motor can provide all the slippage required.) The preferred embodiment of the invention provides a transmission that can operate either in semi- or full-automatic mode, and the driver can switch between these two modes of operation if desired. In semi-automatic mode the driver must determine when to shift and must push a button to activate the shift, whereas in full-automatic mode this is all done for the driver automatically by the electronic control unit and the motor controller.

Although the transmission system has been designed and optimized primarily for use in vehicles, it need not be restricted exclusively to automotive applications. Any application that requires a continuously variable torque/speed transmission can utilize the present invention.

The advantages of this new transmission compared with a standard or fluid automatic transmission can be summarized as follows:

The transmission has an electromagnetic speed/torque converter so it requires significantly fewer gears than a standard transmission. For example, a conventional transmission that has up to 18-gears can be replaced with only 5 gears. Furthermore, the driver can normally start out in second gear if the vehicle is on level ground (i.e. little or no upgrade) so that only 3 shifts are typically required over the full speed range of the vehicle.

The transmission system provides both fully automatic and semi-automatic modes of operation, changeable at the touch of a button.

The transmission is very easy to operate, even for unskilled drivers. The transmission does not require the operation of a clutch. The transmission can produce rapid acceleration because less shifting is required and the engine can operate almost continuously at its peak power range.

The transmission provides an integral speed retarder than can be used either alone or in combination with an engine compression brake. This electromagnetic brake is very quiet and it produces a retarding force that can be modulated over a continuous range or in discrete steps.

The variable speed of the torque converter keeps the engine operating most often in the narrow speed range where it operates at highest efficiency and produces the lowest emissions.

The transmission is mechanically simple, extremely rugged, highly efficient, and less expensive to manufacture than a fluid automatic transmission of comparable size and power rating. There are no parts to wear out or fail other than those found in conventional transmissions. The additional electrical components such as power transistors, resistors, capacitors, etc have no moving parts and provide a mean-time-between-failure (MTBF) well beyond the life of the gears and other mechanical components.

DETAILED DESCRIPTION OF THE PREFERRED EMBODIMENT

Figure 1:
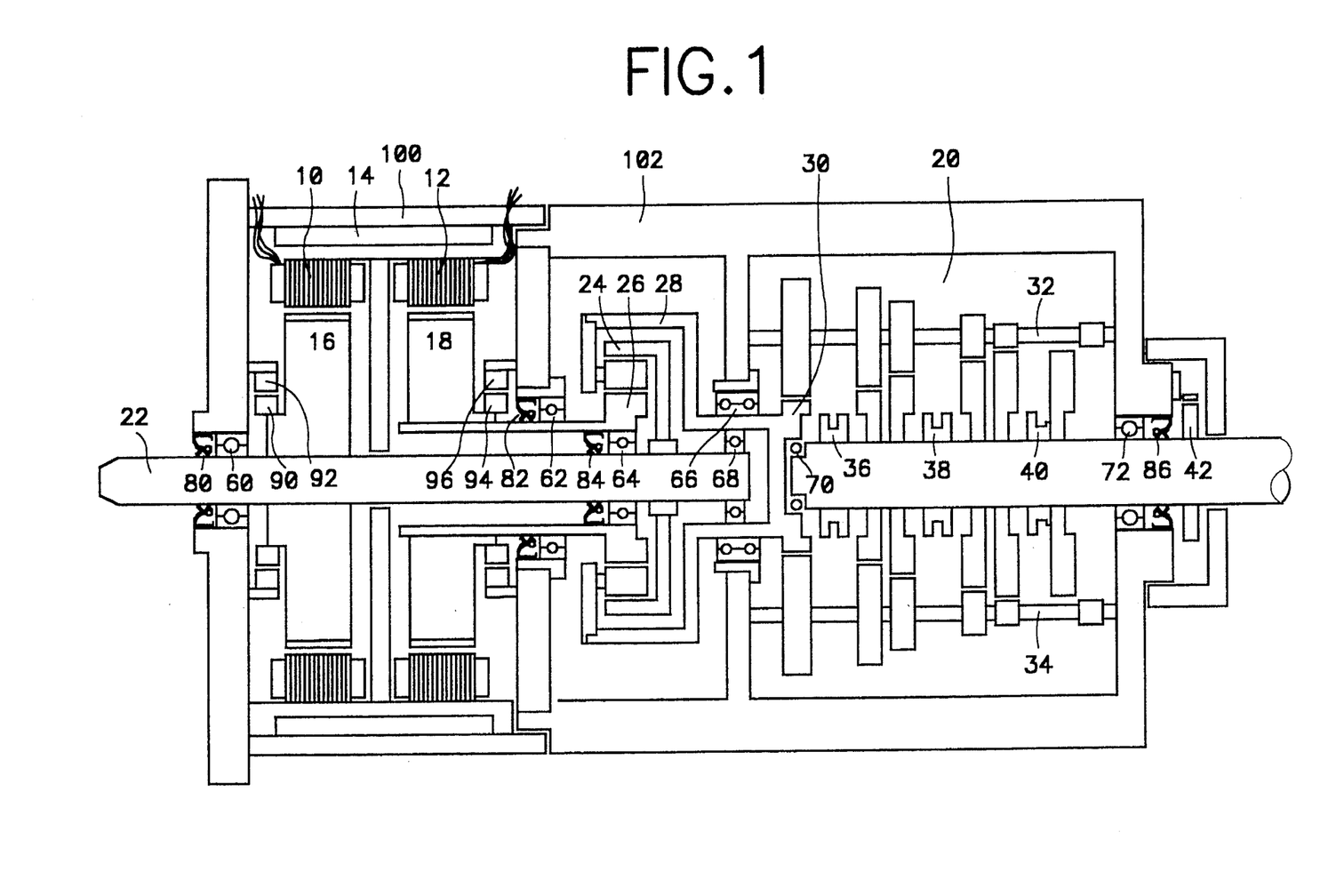
FIG. 1 is a sectional view of an electromechanical transmission with variable speed drive.
Figure 2:
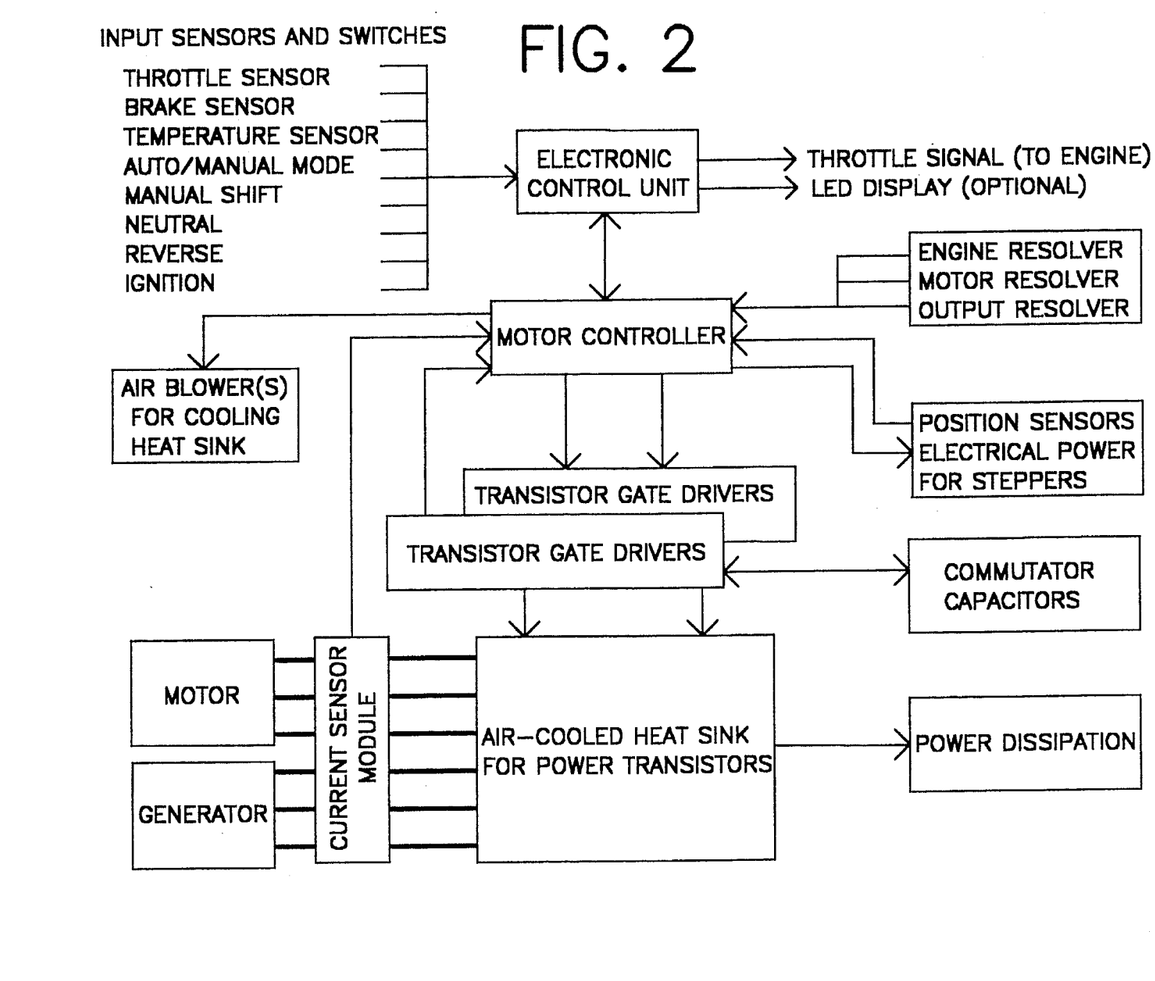
FIG. 2 is a schematic diagram illustrating the interconnection of mechanical and electrical components in the transmission system.
Figure 3:
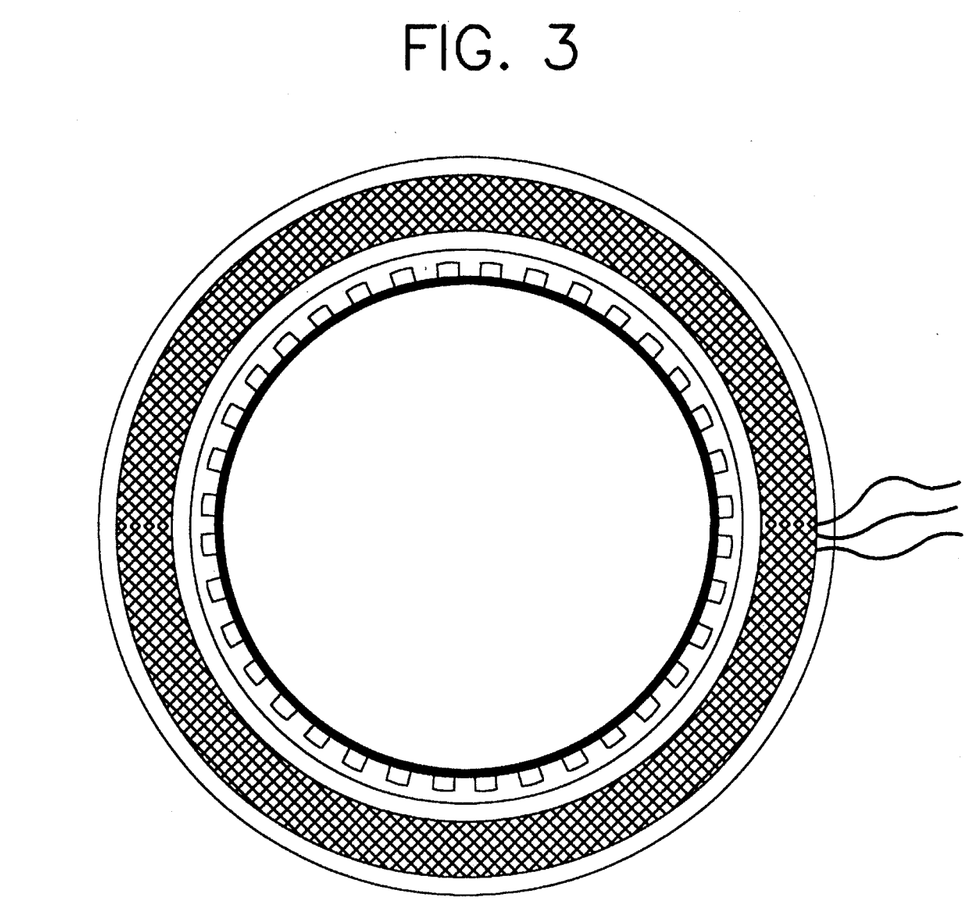
FIG. 3 is an isolated view of the rotor and stator components in a motor-generator.

Referring to FIG. 1, a vehicle transmission consists of an electromechanical torque converter and a multi-speed gearbox. The front torque converter section consists of a pair of motor-generator stators 10, 12 which are integrated within the housing 100, 102 of the transmission. A cooling passage 14 is provided around the periphery of the stators which is also integrated with the housing of the transmission. The motor-generators have rotors 16, 18 which are mechanically interfaced to each other and to the gearbox 20 through a differential gearset. The first rotor 16 is mechanically coupled to the input (engine) shaft 22 and to the outer ring gear 24 of the differential gearset. The second rotor 18 is coupled only to the sun gear 26 of the differential and is free-wheeling. The planetary carrier 28 of the differential is designated as an output and is coupled to the main input gear 30 of the gearbox. The arrangement is such that power flows from the prime mover (engine) to the output shaft by both mechanical and electrical means. Part of the power flows through the system by direct mechanical means, and the remainder is routed through the motor and generator by means of a power transducer. The generator extracts some power from the input shaft and transfers it to the motor, and the differential recombines the split power components. The total power then proceeds through a multispeed gearbox and finally appears at the output shaft.

Referring to FIG. 1 again, the gearbox section consists of a main input gear 30 which drives two or more countershafts 32, 34. The countershafts drive one of the engaged gears except if the gearbox is in neutral or direct drive. Shift collars 36, 38, 40 are provided to allow shifting forks (not shown) to engage the appropriate gear ratios. The end of the gearbox has a toothed wheel or ring magnet 42 for operating a shaft velocity sensor.

The system operates either in driving mode or in braking mode. In discussing the two modes, the following convention will apply. In driving mode, the motor-generator stator 10 coupled to the input (engine) shaft will be referred to as the generator, while the other unit 12 will be referred to as the motor. In discussing braking, however, the opposite will apply. The only exceptions are when the transmission is accelerating from rest, and when resistive braking is performed without the assistance of an external retarder; in these two cases, both units will function simultaneously as generators. The motor controller is actually responsible for determining whether each motor-generator unit is to function as a motor or a generator depending on the operating mode of the transmission.

During normal driving, the motor controller regulates the speed of the engine simply by driving the motor with the proper torque. When the motor is driven in the forward direction, it exerts a torque on the output shaft and a reaction torque on the engine. An additional load is imposed on the engine from the generator which must supply the power required to drive the motor.

Using feedback from the velocity and current sensors, the controller drives the motor with the exact torque required to maintain a desired engine speed. That is, if the actual engine speed is below the desired speed, the controller decreases the torque on the motor. If the engine is above the desired speed, the controller increases the motor torque. It should be emphasized that the desired engine speed is a direct function of the output shaft speed, and the torque of the motor is varied as necessary to maintain the proper ratio between the input and output speeds. (Of course, the desired engine speed may also vary in accordance with the driver's aggressiveness to provide either good fuel economy for cruising or high power output for rapid acceleration.)

When accelerating from rest, there is a small period during which both motor-generator units function simultaneously as generators. This occurs because the motor is initially being driven backwards when the input (engine) shaft is rotating but the output shaft is stationary. The controller is able to simulate clutching action by braking the motor with positive torque as it rotates with negative velocity. In this case, since motor torque and velocity are oppositely directed, their product is a negative quantity which means that power is being generated rather than absorbed. This power must be diverted to the resistors for dissipation. As the vehicle gradually accelerates, the motor too will accelerate, going first from some negative velocity up to zero, and then from zero up to some positive velocity. Once the motor enters the positive velocity range, the product of torque and velocity becomes a positive quantity which means that the motor can absorb power from the generator rather than supply power to the resistor.

When the motor attains its maximum velocity, it will no longer be able to supply the torque required to restrain the engine. The engine will then encounter little resistance from the transmission, and the input shaft may accelerate beyond its optimum range, indicating to the driver or the motor controller that it is time to shift.

Shifting can be performed either manually or automatically. In either case, the procedure can be described as follows. The controller disconnects power to the motor and simultaneously increases the torque on the generator as necessary to prevent the engine from accelerating against no load. During this momentary period, the power from the engine is diverted to the power resistor(s) which serve as a dummy load for the engine. While the engine is being restrained by the generator, and the motor is de-energized, the controller disengages the current gear. Next, the controller rapidly decreases or increases the speed of the motor to synchronize the differential output with the subsequent gear ratio to be engaged. That is, the controller quickly decelerates or accelerates the motor (and possibly the engine) to obtain synchronism between the gears, using feedback from position or velocity sensors that are located on the various rotating shafts. The control unit then engages the desired gear, redirects power from the resistors back into the motor and simultaneously reduces the generator torque to maintain dynamic balance of the rotating elements.

In many applications, depending on the number of gears, the engine may be required to make a velocity step during shifting. To assist in this process, the controller should be programmed to increase the throttle above some minimum value during downshifting, and to limit the engine throttle below some value during upshifting. With control of the engine acceleration, the motor controller could then obtain the synchronization required to complete the shift.

The actual shifting of gears could be effected by means of mechanical actuators which are either pneumatic, hydraulic or electric in nature. Or less preferably, the gearbox could be made of planetary gears that are shifted by locking and unlocking various rotating elements, as is done in conventional automatic transmissions. Many options are possible.

The preferred method of shifting is to employ electromechanical actuators that operate the shifting forks in response to the commands of the driver or motor controller. The actuators should consist of stepper motors coupled to rotatable threaded shafts (screws) which are threaded to the shifting forks. As the stepper motors rotate, the threaded shafts convert the rotary motion into linear motion and drive the shifting forks in the axial direction. The small stepper motors should have position feedback transducers (such as Hall-effect sensors) to allow the controller to track the motors and ensure that the proper shifts have been carried out without failure. When the engine and power are turned off, the motor controller can store the final positions of the stepper motors in non-volatile memory so that it may resume proper operation when power is reapplied.

The engine need not be held at a constant velocity, but rather can be allowed to accelerate within its normal operating range to provide more velocity range per gear ratio and to give the driver an audible sense of acceleration. Furthermore, since the transmission ratio is continuously variable at every instant by the motor controller, it is possible to have various operating curves pre-programmed in memory which can be selected electronically. A feature could even be added to allow the driver to change the operating curve of the transmission as desired. (Note that if a non-diesel engine such as a gas turbine engine is used, the transmission should maintain a truly constant engine speed for optimum fuel efficiency.)

In order to customize each transmission for specific vehicle applications, it is preferable, though not essential, to have an electronic control unit (ECU) that interfaces the driver to the motor controller. The electronic control unit can accept inputs from the driver, such as the throttle and brake position, the kickdown switch setting, and the shift button (or lever) and determine the appropriate torque/speed ratio at every instant. The ECU can also store the specific vehicle and engine data that is required by the motor controller to operate the transmission. This includes memory tables that contain such information as the up and down shift points and the power/torque curve of the engine. This information can then be transmitted electronically to the motor controller. If the vehicle is later used for a different application, or with a different engine, all that is required is a reprogramming of the memory in the ECU.

The invention provides an optional braking mode which is required in most applications.

The transmission has the capability to operate in conjunction with an external speed retarder, such as an engine compression brake, where it assists the operator in maintaining a reasonably constant engine speed even as the vehicle accelerates or decelerates within a gear range. Or the transmission can function as a brake itself, directly converting mechanical power to heat which is then transferred to the cooling fluid. (See power flow chart diagrams.)

When the transmission system is switched into braking mode, assisting an external retarder, the motor controller reverses the roles of the motor-generator units and the power flow is consequently reversed. The motor controller decelerates the generator 12 (formerly the motor) to bring the engine shaft up to the optimum speed needed for the compression brake. The controller then transfers power from the generator to the motor 10, transferring only as much power as needed to drive the engine retarder at the optimum speed. During braking, the vehicle will decelerate (unless it is on a steep downgrade) which in turn will cause the free-wheeling generator 12 to decelerate. Once the generator approaches near zero velocity, it becomes necessary to downshift to a lower gear to continue braking. The engine brake must be disengaged momentarily to allow the transmission to perform a shift, and the braking process may then be resumed in the lower gear.

If the engine or vehicle is not equipped with a speed retarder, resistive braking can be performed by diverting power from both motor-generator units to the power resistor.

Operation is similar to braking with an external retarder, except that the engine shaft has to be restrained rather than driven.

The advantage of coupling the planetary carrier assembly to the output of the differential and employing the ring and sun gears as inputs is that it allows all the two inputs to rotate in the same direction (except of course when the vehicle is at rest). In each gear range, except first gear, the motor begins from near zero velocity and accelerates to approximately the same speed as the engine crankshaft, at which point the differential gearset is effectively rotating as a single unit. The differential velocity between the gear elements decreases as the motor and vehicle accelerate, thus reducing wear on the gears and improving the overall efficiency of the drive train.

The motor and generator should be three-phase brushless devices, each consisting of a rotor and stator, with the rotor containing the permanent magnets and the stator containing the electrical windings. Both the motor and the generator can be identical in construction, though they need not be. Actually, the motor may be slightly larger than the generator, because the motor must produce more torque.

There are a number of parameters involved in the design of the motor-generator units that will determine their performance. The most important of these parameters are the number of magnetic poles on the rotor, the number of turns of wire and the wire thickness in the stator, the size of the air gap between the rotor magnets and the stator, and the diameter and stack length of the stator. The parameters must be properly selected to achieve optimum performance given the maximum torque and speed under which the motor and generate must operate. All of these parameters are interrelated and involve engineering trade-offs.

The electrical characteristics of a motor or generator are completely determined by a few simple constants. These are the motor constant, the voltage constant, the torque constant, the winding resistance and inductance, and the core loss. Some of these are redundant. For example, the voltage and torque constant are proportional to each other and are equal when expressed in metric (MKS) units, so specifying either one completely determines the other. Furthermore, once the voltage or torque constant is known, then specifying the winding resistance determines the motor constant, and vice versa. The voltage (or torque) constant will vary according to the physical dimensions of the motor and all other parameters mentioned previously. The voltage constant is particularly important because it determines the back-emf of the winding at the maximum speed of operation. The voltage constant should be low enough so that the back-emf generated by the rotor magnets and the winding impedance does not exceed the operating voltage of the capacitors and transistors. The voltage constant should only be as low as necessary, however, because it also determines the torque constant which should be as high as possible.

The motor controller requires position and velocity feedback from the motor, generator and the output. Feedback can be obtained from tachometers, resolvers or any type of angular measurement devices which are placed on the shafts of the rotors. In the preferred embodiment, brushless resolvers are integrated with the motor and generator to provide precise positional feedback which is then differentiated by the controller to determine velocity and acceleration. As indicated in FIG. 1, the resolvers consist of rotors 90, 94 and stators 92, 96 which are attached to the rotating shafts and the housing of the transmission, respectively. The output shaft does not require the high resolution of a resolver; the speed can be accurately measured with a simple and inexpensive magnetic sensor which detects the presence of rotating gear teeth or a disk with alternating magnetic poles; this is acceptable since the output shaft is coupled to the vehicle which has a much lower force-to-inertia ratio (acceleration) than the motor-generator units.

Power transistors are required for controlling the currents in the motor and generator. The power transistors have gates which require some electrical current during switching. These gates should be driven by current buffers which are optically isolated to provide electrical noise insulation between the transistors and the digital logic circuits. Since the wires connecting the transistors to their gate drivers will have some parasitic inductance, it is important that the gate driver circuits be located as close as possible to the power transistor bank, perhaps on their own individual printed circuit boards. This will minimize oscillations in the wires and thus protect the transistors from possible damage.

The motor controller and gate drive circuitry should operate the transistors with constant frequency, variable pulse-width switching cycles. By varying the relative duty cycles of the power transistors, the motor controller can program the current wave form in the windings of the motor and generator. If the three-phase motor and generator are designed to provide a sinusoidal back-emf wave form, then the average currents in the windings should be a sinusoidal function of the angular position of the rotor. Ideally this provides a non-pulsating rotor torque. A less preferable alternative is to drive the motor and generator in a six-step mode, which means that the average winding currents are commutated in six discrete steps for each electrical cycle; this leads to an undesirable pulsation in torque which must be smoothed out by the mechanical inertia of the rotor.

The motor controller is responsible for controlling the dynamic performance of the transmission. To accomplish this, the motor controller must implement certain closed-loop feedback transfer functions. These mathematical algorithms receive input data from the driver and the various feedback sensors and provide output data that is used to control the motor and generator.

The motor controller requires some feedback indicating the magnitudes of currents in the motor and generator. This can be achieved most simply by passing the wires through a current sensor module. The current sensor module should consist of magnetic (ferrite) cores wrapped with fine wire. The cores should be gapped and have magnetic Hall-effect generators placed inside of them. These Hall-effect generators are soldered to an underlying printed circuit board which contains some analog circuitry that senses the current. If the three-phase motor and generator units are wound in a Wye configuration, as opposed to Delta, only two winding currents on each motor-generator unit need to be measured; the third winding current is then determined mathematically as the sum of the other two currents multiplied by negative one.

The motor controller and electronic control unit can be remotely located from the gate driver modules because they do not send high frequency, high current signals. Only low-current digital signals are communicated between the motor controller, the ECU, and the gate-driver modules, and these digital signals can be transmitted through differential wire pairs or through fiber optics. If these signals are transmitted through cables, it is essential to use electrostatic shielding on all wires. Shielding on motor wires and cables will minimize the transmission and reception of noise which could otherwise interfere with the sensitive digital and analog circuitry.

The transmission can also be located at a distance from the power transistors and capacitors. For this purpose heavy copper bus bars (not shown) should be provided to carry the motor and generator currents to and from the power transistor bank. The relatively thin motor-generator wires 50, 52 shown in FIG. 1 should be as short as possible and should connect immediately to the heavier copper bus bars. To minimize the transmission of noise, the bus bars should be encased in an outer metal shield which is electrically grounded.

A water jacket 14 is placed circumferentially around the large stator rings of the motors, integrated with the housing of the transmission. Water or other fluid is pumped through this cooling passage to remove the heat dissipated by the winding and core losses of the stators. The water jacket can be part of the same fluid circuit used to cool the engine, or it can be cooled by a completely separate thermal circuit, perhaps with its own radiator.

In order for the transmission system to be properly cooled, the motor-generator units must be surrounded by water passages, and the power dissipation elements (resistors) must be in thermal contact with fluid. The oil reservoir for the gears should be cooled on large transmissions, perhaps by allowing some of the tubing that carries the cooling fluid to pass directly through the oil sump.

The fluid emerging from the heat exchanger should be circulated first through the water jacket surrounding the motor-generators, then through the gearbox oil reservoir and finally through the power dissipation elements. If the flow of coolant moves sequentially along a single path rather than through different paths in parallel, it is preferable that the flow proceed in this order to maintain the motor-generator units at the lowest possible temperature.

Power dissipation elements are employed to dissipate power during braking, clutching (accelerating from rest), and during shifting. The heating elements dissipate heat by transferring it to the circulating fluid. Obviously each electrical resistor cannot be in direct contact with the fluid. The heating elements could heat metal tubes through which the coolant is being pumped. The heating elements could be simple power resistors made of Nickel-Chromium heating wire wrapped around these metal conduits. The metal would have to be electrically insulated to prevent the wires from being shorted out. This could be accomplished by applying thin plasma coatings of a material (e.g. aluminum oxide) that is electrically insulating but thermally conducting. It should be noted that although it is not essential to have more than one resistor, it is preferable that at least two power resistors be employed to assist in the operation of the transmission. If two unequal resistors are used, then three power settings can be achieved by operating either of the resistors individually or both simultaneously. This does not imply that only three discrete braking settings would be possible; the controller can vary the braking force over a continuous range by pulsing the resistors at a certain frequency and modulating the width of the pulses to control the average duty cycle.

It should be mentioned that the transmission system is not limited to any particular dissipation means. The system could also dissipate power through other means such as induction heating, for example.

The power transistors must be fastened to a metal heat sink that is cooled by forced air convection. Although water cooling could be used, it is preferable that air cooling be used because the radiator fluid may be too hot for the transistors. Therefore, an extruded metal or bonded fin heat sink should be used, and ambient air should be forced through the heat sink to remove the heat generated by the transistors.

The heat sink contains not only the power transistors, but also snubber capacitors, diodes and resistors. The snubber capacitors are generally required to absorb the transient energy stored by the parasitic wire inductance during transistor turn-off, thus reducing the stress on the transistors. During each switching cycle, the snubber capacitors are charged rapidly through diodes, and then allowed to discharge relatively slowly through the snubber resistors. Since the snubber resistors generate heat, they should be in thermal contact with the heat sink. The diodes, however, do not generate much heat and therefore do not require metal heat sinking. A small amount of forced air convection should be adequate for cooling the diodes and the snubber and commutator capacitors. The RC time constant of the snubber capacitors and resistors should be less than the transistor switching period. This is necessary to allow the snubber capacitors to discharge most of their stored energy before the next charge cycle begins.

The commutator capacitors can be placed at greater distances from the transistors than the snubbers. Although they have higher parasitic inductance associated with their connecting wires, they have much higher capacitance and they can be charged and discharged without restrictions imposed by diodes or resistors. These commutator capacitors store more energy than all the snubbers combined and they enable the motor controller to adjust the response of the system and maintain control and stability of operation.

In order to maximize the life of the power transistors, it is important to minimize the repetitive temperature cycling of the heat sink. This can be accomplished by providing more than one speed setting for the air blower so that the air flow can be varied in proportion to the transistor power dissipation, which in turn is proportional to motor torque. If the air flow through the heat sink is modulated in some proportion to the transistor heat dissipation, the thermal cycling of the transistors can be significantly reduced.

Because this transmission has an additional compartment for the motor and generator (torque converter section), it is difficult to get oil to at least one of the bearings. Unless a complex design is used that can route oil to the front compartment, at least one of the bearings 60 will have to be sealed with high-temperature grease. A good high-temperature grease is essential to reduce the tendency of the lubricant to slowly oxidize and evaporate over time. It should be noted that the exact number and placement of bearings 60, 62, 64, 66, 68, 70, 72 is not critical to the successful operation of the invention. The same is true for the seals 80, 82, 84, 86 as long as the oil remains sealed inside the gearbox.

Although there are power losses in the gears, in the motor and generator, and in the power transistors, the entire transmission system is highly efficient. With proper design the motor and generator losses can be made very small. Furthermore, when the gearbox is set to the highest gear (direct drive) there is no gear loss other than that in the planetary (differential) gearset. The planetary gears have a variable power loss depending on the relative speed differential between the rotating elements. The transmission was designed so that this power loss and mechanical wear diminish to zero as the motor approaches the speed of the engine; that is, as the planetary gears approaches nearly synchronous rotation, the power loss in the differential gears tends to zero.

Figure 4:
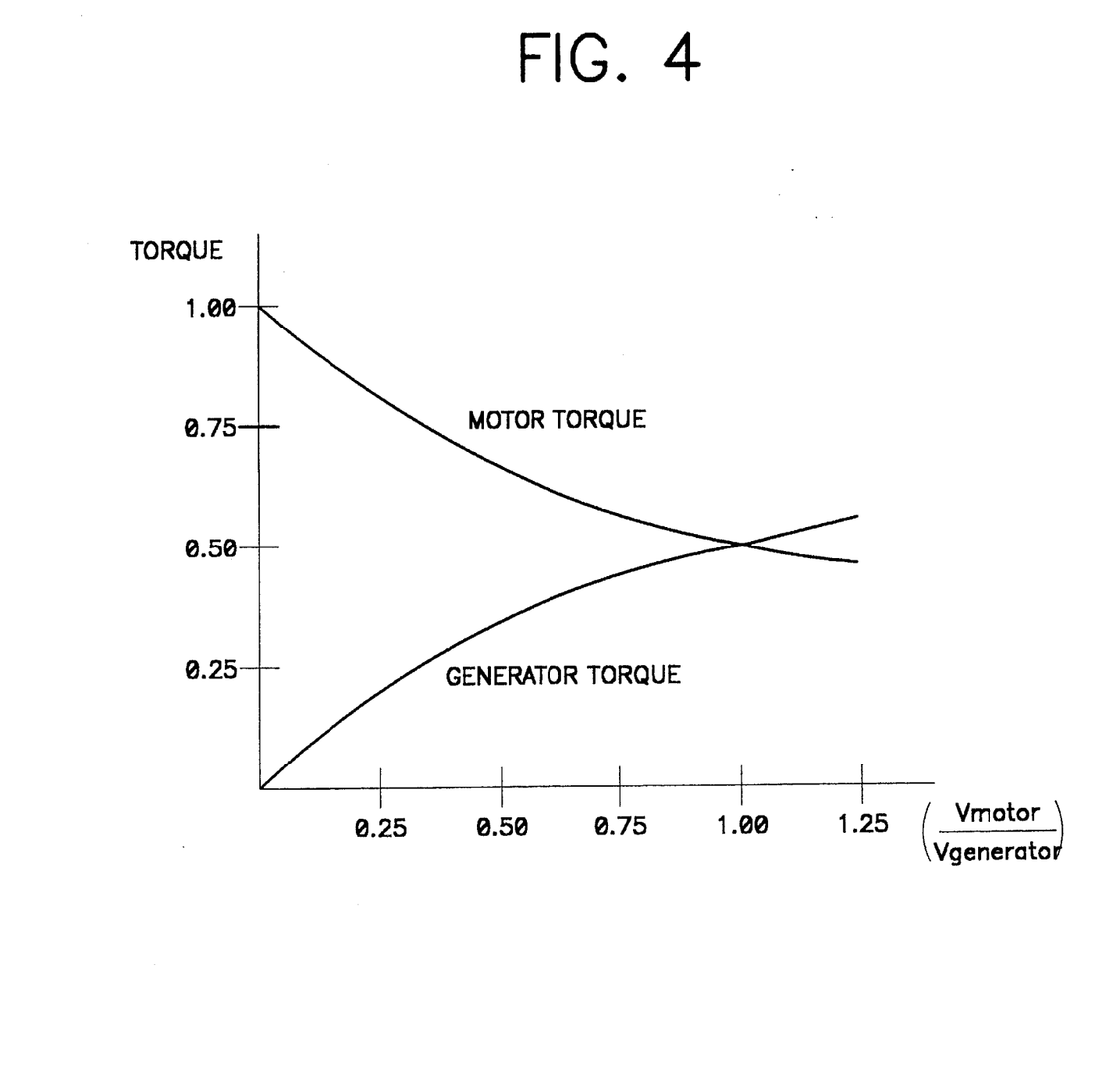
FIG. 4 is a diagram showing the relative motor and generator torque amplitudes as a function of the motor-to-generator velocity ratio.
Figure 5:
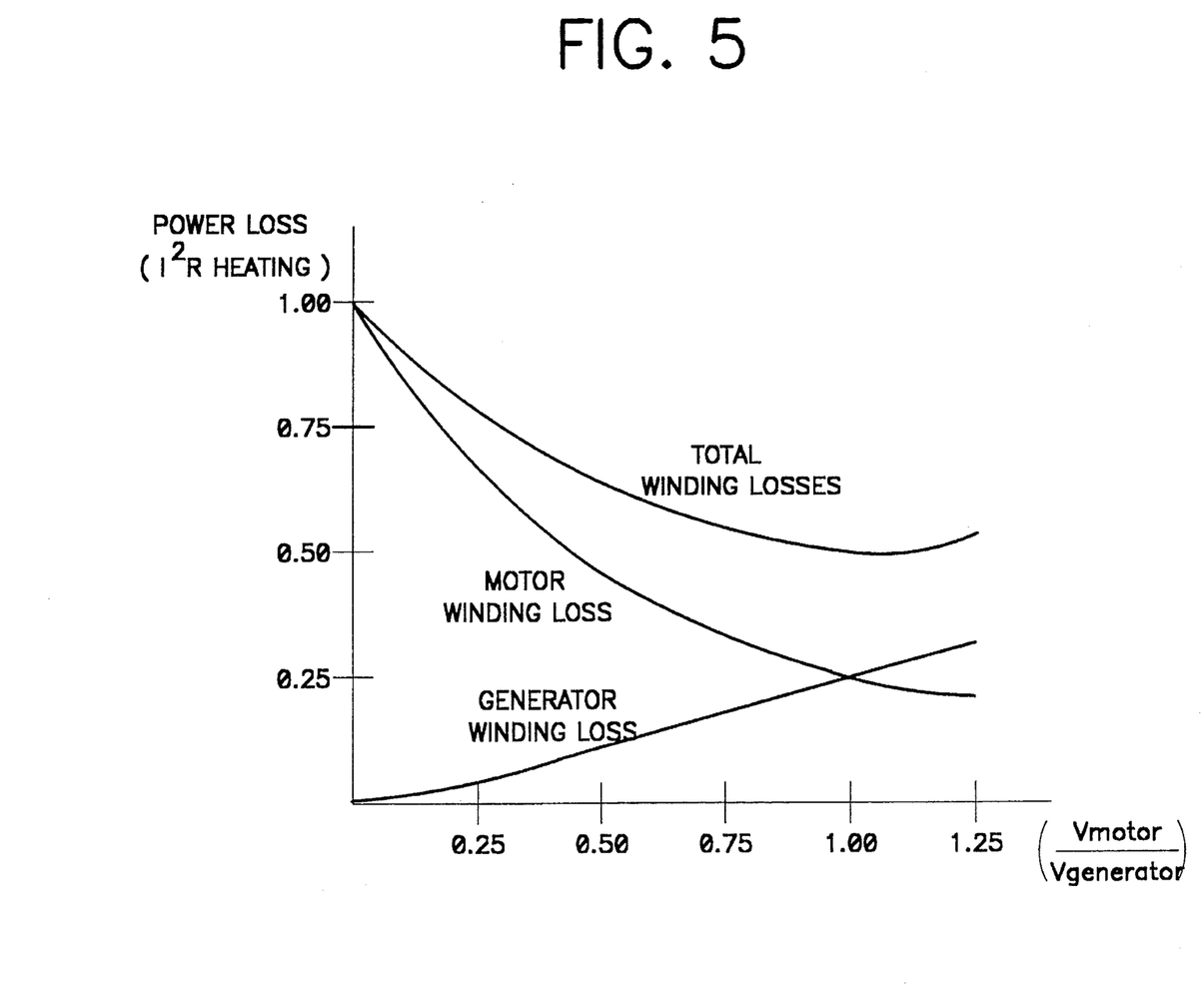
FIG. 5 is a diagram showing the relative motor and generator winding losses as a function of the motor-to-generator velocity ratio.

The motor and generator have two types of power losses: winding losses and core losses. The winding losses are due to the $I^2R$ power dissipation. This power loss is dependent on the engine torque and on the motor-to-generator speed ratio, as shown in the power loss chart. The generator winding losses are fairly small, assuming that it has nearly the same motor constant, because it always provides its power at high speed and therefore does not produce high torque. See motor and generator torque curves for a graphic illustration.

The core losses consist of two components, hysteresis losses and eddy current losses. The hysteresis losses are almost linearly proportional to the speed of the motor, and the eddy current losses are roughly a quadratic function of the speed. For low hysteresis losses, it is important to use high-quality silicon steel laminations. Eddy current losses can be minimized by decreasing the thickness of the laminations.

The power transistor losses consist of two components, current losses and switching losses. The motor and generator currents must flow against voltage drops in the transistors; these are due to the saturation voltage of the transistors and the free-wheeling diode drop. There are also switching losses since the transistors do not switch instantaneously. The transistor losses should consume less than 1% of the total engine power.

The transmission system has an overall efficiency that is typically comparable to, or greater than, that of a fluid automatic transmission. An additional increase in energy efficiency is obtained because the engine is allowed to operate within its optimum speed range; this is not possible in fluid automatics that operate torque converters in lock-up mode.

MATHEMATICAL ANALYSIS

A clear and concise mathematical analysis, which is essential for engineering purposes, will now be presented. We shall begin this analysis with the equation for a differential gear mechanism. It may be helpful to briefly describe a differential or epicyclic gearset, since this device is utilized in the present invention and is prevalent in so many power train systems. A differential gearset is a device, such as a planetary or bevel gearset, which has at least three shafts, two of which are gears and the third of which is a pinion carrier assembly. Any shaft can be arbitrarily designated as an input, another as an output, and the third can be operated as either an input or an output. The differential gear apparatus provides the extremely useful function of summing two shaft velocities to be proportional to the velocity of the third shaft. Accordingly, a differential gearset can be considered a mechanical adding device, satisfying the equation $$AV_x + BV_y = CV_z,$$

where A, B and C are scaling constants, and $V_x$, $V_y$ and $V_z$ are the angular velocities of each shaft. When applied to this invention, the preceding equation can be written as $$AV_{engine} + BV_{motor} = CV_{carrier\ output}.$$

One of these three constants is redundant and can be arbitrarily set equal to one by dividing through by that value. For convenience, B can be defined to be equal to one. Then A is simply the ratio of the outer ring to sun ring diameters. C must be equal to A plus one since the equation must be satisfied identically when all velocities are equivalent and the differential is rotating as a whole. Thus, $$AV_{engine} + V_{motor} = (A+1)V_{carrier\ output}.$$

But the output velocity of the differential is R times faster than the transmission's output shaft, so that $$AV_{engine} + V_{motor} = R(A+1)V_{transmission\ output},$$

where R is the reduction ratio of the engaged gear.

The transmission's operating mode can be described mathematically as follows. Initially the output is at rest and the motor is being back driven without resistance at a velocity given by $$V_{motor} = -AV_{engine}.$$

(This is a requirement of the planetary gear equation, obtained by substituting $V_{output}=0$.)

As the motor is decelerated to rest from its negative velocity, the output accelerates to velocity $$V_{output} = \frac{AV_{engine}}{R(A+1)}.$$

Then as the motor accelerates in the positive direction, $V_{output}$ accelerates further as given by $$V_{output} = \frac{AV_{engine} + V_{motor}}{R(A+1)}.$$

We can solve this equation for $V_{engine}$ and $V_{motor}$. Solving for $V_{engine}$ yields $$V_{engine} = \frac{R(A+1)V_{output} - V_{motor}}{A}$$

This equation is useful for synchronization during gear shifting. Upshifting is performed when the motor has attained its near maximum speed and must be suddenly decelerated to rest. Downshifting is required when the motor has reached its slowest speed and must be rapidly accelerated to its near maximum speed. By substituting the new motor speed into the preceding equation, we can determine the new engine speed required during a gear shift.

The equation required during driving (or braking) mode is $$V_{motor} = R(A+1)V_{output} - AV_{engine}.$$

This is essential because it gives the required motor speed as a function of the output speed and the desired engine speed. The output shaft speed is determined continuously by direct measurement. The desired engine speed is a function of the output shaft speed; the engine operates within a narrow range and varies gradually in accordance with the output shaft speed. The desired engine speed can also be modified slightly in accordance with the throttle setting or a kickdown switch to achieve momentary peak power output. During normal driving operation, the electronic control unit measures the output shaft speed, looks up the desired engine speed in a gear ratio memory table, varies the memory value if necessary to account for throttle setting, and then substitutes this value along with the measured output velocity into the preceding equation to determine the required motor speed. This process is repeated at a sufficiently high frequency to ensure smoothness of operation.

Taking deltas of both sides of the $V_{output}$ equation and dividing through by $V_{output.O}$ (where $V_{output.O}$ is the initial output speed from which the change is measured), we obtain $$\frac{\Delta V_{output}}{V_{output.O}} = \frac{A\Delta V_{engine} + \Delta V_{motor}}{R(A+1)V_{output.O}}.$$

But $$V_{output.O} = \frac{AV_{engine.O} + V_{motor.O}}{R(A+1)},$$

so that $$\frac{\Delta V_{output}}{V_{output.O}} = \frac{A\Delta V_{engine} + \Delta V_{motor}}{AV_{engine.O} + V_{motor.O}}$$

Using the identity $V_{output}=V_{output.O}+\Delta V_{output}$, we have, finally, $$V_{output} = \left[ \frac{A\Delta V_{engine} + \Delta V_{motor}}{AV_{engine.O} + V_{motor.O}} + 1 \right] V_{output.O}.$$

The last equation gives the output velocity as a function of the initial velocity of the motor, the engine and the output, and the change in the velocities of the motor and engine. It can be used during the transmission design to determine the number of gears and the spacing between gear ratios.

The fundamental equation relating the torques and velocities of the motor and generator can be derived from the conservation of energy. Under normal operating conditions, the power drawn by the generator must be approximately equal to the power consumed by the motor, except when accelerating from rest. We can establish therefore that $$(T_{generator})(V_{generator}) = -(T_{motor})(V_{motor}),$$

where T is torque and V is the angular velocity. Furthermore, the torque which the motor must produce to maintain equilibrium is given at any instant by $$T_{motor} = \frac{(T_{engine} - T_{generator})}{A}$$

where A, once again, is the ratio of the number of ring gear to sun gear teeth in the differential. Combining these two equations, we can obtain two additional equations $$T_{motor} = \frac{T_{engine}}{A(1 + V_{motor}/V_{generator})}$$

and $$T_{generator} = -\frac{T_{engine}(V_{motor}/V_{generator})}{A(1 + V_{motor}/V_{generator})}.$$

If we assume the torque and speed of the engine to be constant (i.e. constant power output), we see that $T_{motor}$ varies from $T_{engine}/A$ when the motor is stationary and decreases to $T_{engine}/2A$ as the velocity approaches the engine (generator) velocity. The generator, on the other hand, begins with zero torque when the motor is stationary, and increases to $T_{engine}/2A$ as the velocity of the motor approaches that of the engine. Evidently, the largest torque that must be borne by the motor occurs when it is stationary and is determined by $T_{engine}/A$. The constant A represents the mechanical advantage, so that as A is increased the torque that the motor must handle is decreased. Since the torque of the engine is generally quite large, it usually becomes necessary to give the motor a mechanical advantage through the differential, so that the motor operates within its maximum torque limit. Too large a mechanical advantage will, however, reduce the range of the CVT, necessitating more gear ratios in the gearbox. (A good value for A is around 2.)

From the preceding equations, we find the power absorbed by the generator to be $$P = (T_{engine})(V_{generator})/2A \text{ or}$$

$$P = P_{engine}/2A,$$

where A once again represents the mechanical advantage of the motor with respect to the input shaft. The constant A, which represents the ratio of the number of outer ring gear teeth to the sun gear teeth, should be around the value of 2. This result indicates, therefore, that the maximum power that must be handled by the electrical system is less than half the power produced by the engine.

ANALYSIS OF HEAT CONDUCTION, CONVECTION, AND DISSIPATION

The circumferential surface area of the stators and the water jacket must be large enough to permit heat to flow readily without a large temperature difference. The jacket wall should also be as thin as possible to create the smallest temperature drop for a given amount of heat dissipation. For heat conduction within solid objects, the heat transfer equation is given approximately by $$dT/dL = P/kA$$

where $dT/dL$ is the temperature gradient, P is the heat flux, k is the thermal conductivity of the material, and A is the area through which the power is flowing. Assuming the material is homogeneous, k will be constant and the temperature difference between any two points can be expressed as $$\Delta T = \int dT = (P/k)\int (1/A)dL$$

The heat flow from the metal surface of the jacket to the flowing water is impeded by a thin boundary layer near the surface. For fully developed turbulent flow, the temperature rise across this boundary layer is determined approximately by the equation $$\Delta T = \frac{P}{[0.025\,(k/d)\,Re^{0.8}\,Pr^{0.4}]A}$$

where d is a characteristic length of the conduit (typically the dimension with the smallest clearance), and Re and Pr are the dimensionless Reynolds and Prandtl numbers respectively. These dimensionless numbers are defined by $$Re = Vd/\nu \text{ and } Pr = \mu C_p/k = \rho \nu C_p/k,$$

where V is the average fluid velocity, $\mu$ is the dynamic viscosity, $\nu$ is the kinematic viscosity, and $C_p$ is the specific heat capacity at constant pressure. It should be noted that the Reynold and Prandtl numbers are functions of fluid properties which depend on the temperature of the fluid, particularly if the fluid is a liquid. For water @100 degrees C., a typical radiator coolant temperature, these variables are as follows:

| | |
|---|---|
| specific heat | $C_p = 4220$ J/kg-deg C., |
| thermal conductivity | $k = 0.681$ W/m-deg C., |
| fluid density | $\rho = 957$ kg/m$^3$ |
| dynamic viscosity | $\mu = 278 \times 10^{-6}$ kg/m-s, |
| kinematic viscosity | $\nu = 0.290 \times 10^{-6}$ m$^2$/s, and |
| Prandtl number | $Pr = 1.72$. |

Therefore, the heat transfer equation for water at 100 degrees C. is $$\Delta T = \frac{P}{[(0.02 \text{ W/m-deg C.})\,Re^{0.8}/d]A}$$

It is well known from fluid mechanics that when the Reynolds number is below the value of 2100, the flow is laminar, and when the number exceeds 2100, the flow becomes turbulent. For the purpose of this invention, the Reynolds number will always be far greater than 2100, which means that the fluid flow will be turbulent and the foregoing equation for turbulent heat transfer is applicable.

This heat transfer equation can be used for calculating the temperature drop across the fluid boundary layer for a given power dissipation. It can be applied to the water jackets of the motor-generator units and to the power resistor heating elements.

Since heat flux is proportional to surface area, it should be possible to increase the heat flux if necessary by increasing the width of the jacket or by grooving the circumference to provide a serrated surface.

The volume of fluid that must be pumped per unit time to remove a given amount of heat is given by $$\text{Volume/time} = P/(\rho C_p \Delta T),$$

where P is the power in Watts that must be dissipated, $\rho$ is the fluid density, $C_p$ is the specific heat capacity, and $\Delta T$ is the maximum permissible temperature rise of the fluid in degrees Celsius. When these units are used, the resulting value will be in cubic meters per second.

We can calculate the flow of air required to cool the transistor heat sink based on a maximum temperature rise. We merely substitute into the flow rate equation the specific heat of the air (or cooling fluid), the maximum allowable temperature rise $\Delta T$ of the fluid, and the amount of power to be dissipated by the transistors.

ANALYSIS OF WINDING AND CORE LOSSES

We can determine the average winding losses for the motor and generator as follows. The mean power dissipation is given by the mean square of the motor (or generator) torque divided by the square of the motor (or generator) constant. The motor (or generator) torque, however, is a function of the engine torque and the motor-to-generator velocity ratio. If we assume that the motor-to-generator velocity ratio ranges from 0 to 1, and has a uniform probability density over this range, then the mean square torque of the motor can be easily calculated. This is accomplished by squaring the motor and generator torque equations, integrating the results with respect to the velocity ratio, and then dividing through by the total change in velocity ratio (which is unity). If we begin with the fundamental equations for motor and generator torque, as derived previously, and perform these simple mathematical calculations, we find that the mean square of the motor torque is $$<T_{motor}^2> = 0.5 <T_{engine}^2>/A^2$$

and the mean square of the generator torque is $$<T_{generator}^2> = 0.12 <T_{engine}^2>/A^2.$$

With the mean squares of the motor and generator torques, we can now calculate the total average winding dissipation from the equation $$<P_{winding\ loss}> = <(motor\ torque/motor\ constant)^2> + <(gen\ torque/gen\ constant)^2> = [0.5<T_{engine}^2>/K_m^2 A^2] + [0.12<T_{engine}^2>/K_g^2 A^2].$$

We can also determine the average core losses for the motor and generator in a similar manner. We know that power loss in the core is given by $P=\alpha\omega+\beta\omega^2$. Since the generator (or engine) operates within a narrow velocity range, the average generator core loss will be almost equal to its core loss at its average velocity. The motor, however, accelerates over a wide velocity range, so its average core loss has to be calculated analytically using the same method as before. If we assume that the angular velocity of the motor is evenly distributed over its entire range, then we can compute the average core loss by integrating with respect to the angular velocity and dividing by the entire range of angular velocity. Upon doing so, we obtain $$<P_{motor\ core\ loss}>=(1/\Delta\omega)\int P\ d\omega=(1/\Delta\omega)[\ \alpha\omega^2/2+\beta\omega^3/3]|_{V_{min}}^{V_{max}}=[1/(\omega_{max}-\omega_{min})][\alpha(\omega_{max}^2-\omega_{min}^2)/2+\beta(\omega_{max}^2-\omega_{min}^2)/3].$$

If we assume further that the angular velocity of the motor ranges from 0 to $\omega_{max}$, then this equation simplifies to $$<P_{motor\ core\ loss}>=(1/\omega_{max})[\alpha\omega_{max}^2/2+\beta\omega_{max}^2/3].$$

If we add the mean core losses to the mean winding losses, we obtain the total average power dissipation of the motor and generator system.

What I claim is:

1. A transmission system comprising:
   a first permanent-magnet motor-generator comprising a first rotor and a first stator, said first rotor containing the permanent magnets and said first stator containing electrical windings, said first stator having an outer diameter larger than its width, and said first rotor being operably connected to input shaft of transmission;
   a second permanent-magnet motor-generator comprising a second rotor and a second stator, said second rotor containing permanent magnets and said second stator containing electrical windings, said second stator having an outer diameter larger than its width;
   torque transmitting means including at least one differential gear mechanism wherein said differential gear mechanism has at least three rotating elements, a first element of which is operably connected to first motor-generator, a second element of which is operably connected to second motor-generator;
   a housing surrounding the stators of the motor-generators which contains an integrated cooling passage; and
   means for sensing motion of at least one of the rotating elements of the differential gear mechanism.

2. The transmission system of claim 1 wherein a third element of the differential gear mechanism is operably connected to a multispeed gearbox.

3. The transmission system of claim 2 wherein the mechanical shifting is performed by electromechanical actuators.

4. The transmission system of claim 1 including means for electrical power dissipation.

5. The transmission system of claim 4 wherein means for power dissipation consists of electrically resistive heating elements.

6. A transmission system comprising:
   a first permanent-magnet motor-generator comprising a first rotor and a first stator, said first rotor containing permanent magnets and said first stator containing electrical windings, said first stator having an outer diameter larger than its width, and said first rotor being operably connected to input of transmission;
   a second permanent-magnet motor-generator comprising a second rotor and a second stator, said second rotor containing permanent magnets and said second stator containing electrical windings, said second stator having an outer diameter larger than its width;
   torque transmitting means consisting of at least one planetary gear mechanism having at least three rotating elements, one element of which is operably connected to first motor-generator, a second element of which is operably connected to second motor-generator;
   a multispeed gearbox which is operably connected to a third element of the planetary gear mechanism;
   a housing surrounding the stators of the motor-generators which contains an integrated cooling passage; and
   means for sensing movement of at least one of the rotating elements in the differential gear mechanism.

7. The transmission system of claim 6 wherein the mechanical shifting is performed by electromechanical actuators.

8. The transmission system of claim 7 which includes means for electrical power dissipation.

9. The transmission system of claim 8 wherein means for power dissipation consists of electrically resistive heating elements.

10. The transmission system of claim 6 wherein means for sensing rotational movement includes at least one resolver.

11. A transmission system comprising:
    a first permanent-magnet motor-generator comprising a first rotor and a first stator, said first rotor containing permanent magnets and said first stator containing electrical windings, said first stator having an outer diameter larger than its width, said first rotor being operably connected to and coaxial with input shaft of transmission;
    a second permanent-magnet motor-generator comprising a second rotor and a second stator, said second rotor containing permanent magnets and said second stator containing electrical windings, said second stator having an outer diameter larger than its width, said second rotor being coaxial with input shaft of transmission;
    torque transmitting means consisting of at least one planetary gear mechanism having at least three rotating elements, one element of which is operably connected to first motor-generator, a second element of which is operably connected to second motor-generator;
    a multispeed gearbox which is operably connected to a third element of the planetary gear mechanism;
    a housing surrounding the stators of the motor-generators which contains an integrated cooling passage;
    means for sensing movement of at least one of the rotating elements in the differential gear mechanism; and
    a power transducer for controlling the flow of power through motor-generators.

12. The transmission system of claim 11 wherein the mechanical shifting is performed by electromechanical actuators.

13. The transmission system of claim 11 which includes means for electrical power dissipation.

14. The transmission system of claim 13 wherein means for power dissipation consists of electrically resistive heating elements.

15. The transmission system of claim 11 wherein means for sensing rotational movement includes at least one resolver.

* * * * *